United States Patent Office 2,752,009
Patented June 26, 1956

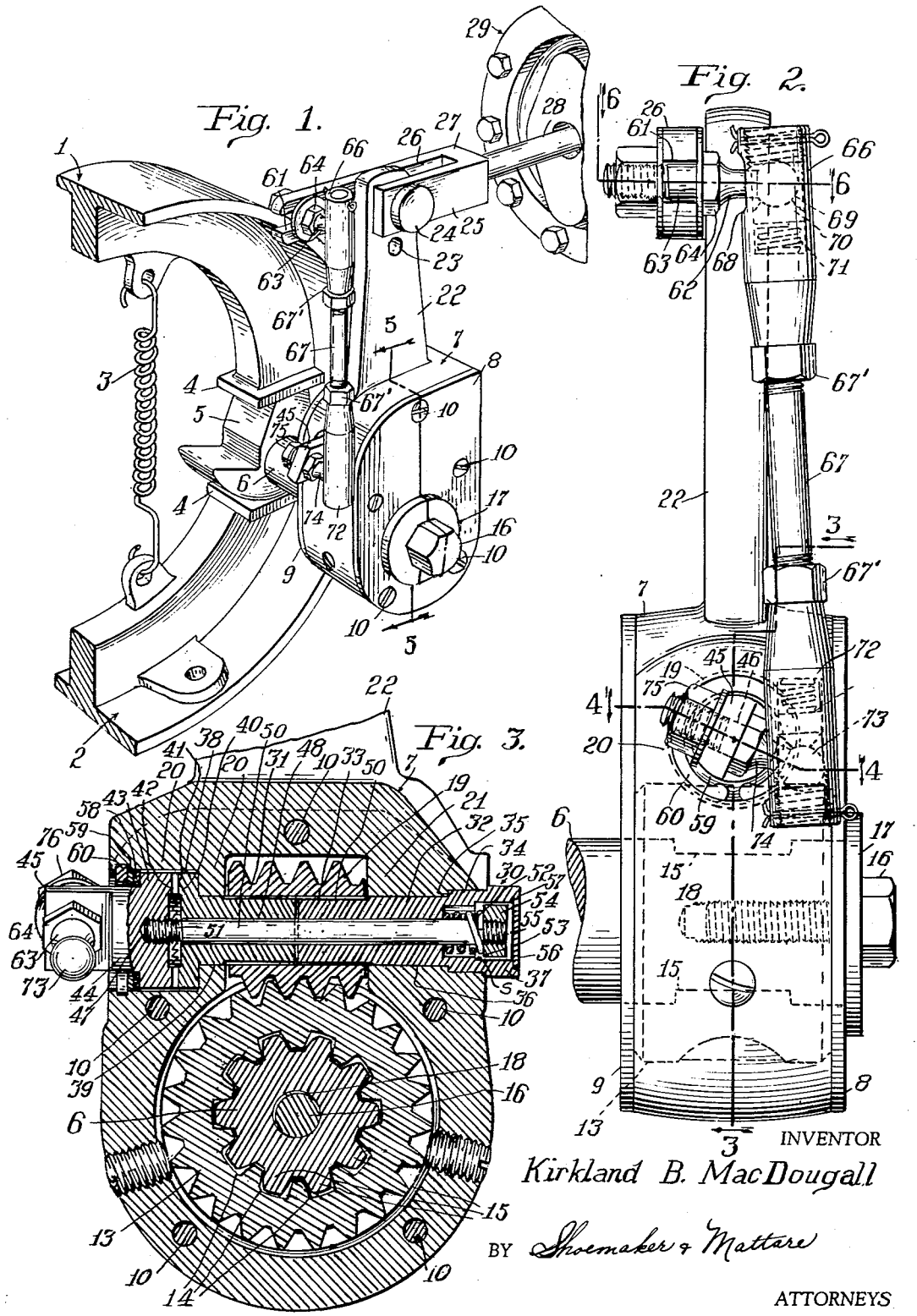

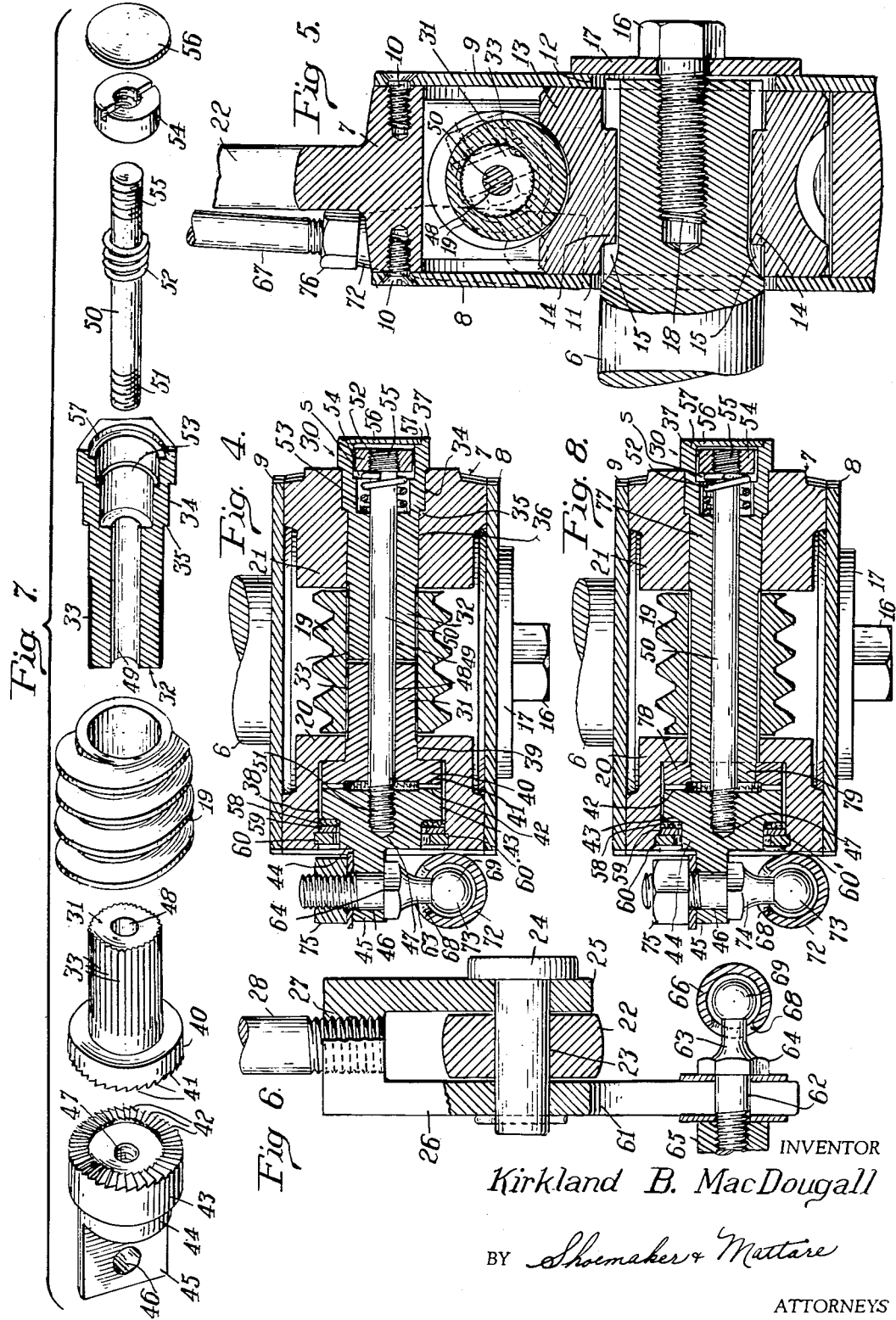

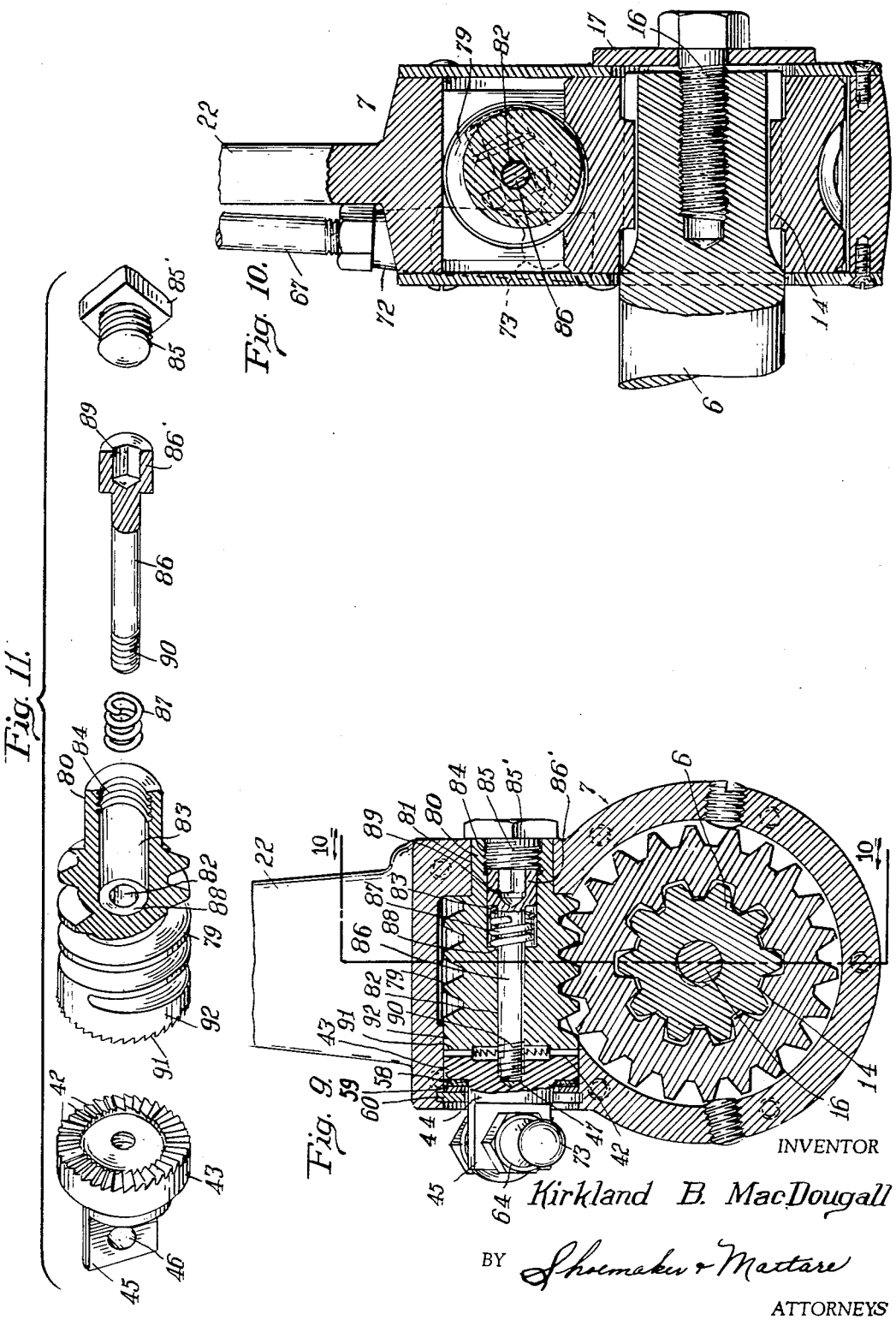

2,752,009

SLACK ADJUSTING MECHANISM

Kirkland B. MacDougall, Benton, Pa.

Application March 19, 1953, Serial No. 343,331

16 Claims. (Cl. 188—196)

This invention relates to a device for taking up slack in the operating mechanism for vehicle brakes and particularly the brakes of trucks and other automotive vehicles which are heavy and wherein the brakes are cam-operated.

When brakes are applied the linings are subjected to heavy pressure and friction which causes them to be gradually worn until the linings become reduced in thickness to such an extent that proper braking action can not take place. It is then necessary to make adjustments in order to eliminate slack and thus compensate for the wear upon the brake linings.

It is very dangerous to have brakes fail when a vehicle is traveling along a steep road and it is, therefore, customary for the driver of a truck, moving van, or other heavy vehicle, to test and inspect his brakes periodically during a trip and make adjustments when necessary. Some vehicles have brake operating mechanism including manually operated adjusting means and others have automatically operated adjusting means and in my co-pending application filed September 5, 1951, Serial No. 245,114, now Patent No. 2,743,793, there has been shown a brake adjusting mechanism having both manually operated and automatically operated slack adjusting means which are so associated with the brake operating mechanism and each other that they may be independently operated, the automatic means functioning when a vehicle is in motion and the manually operated means when the vehicle is at a standstill and thus allow adjustments to be made when a vehicle is brought to a stop after reaching the bottom of a hill in case such manual adjustment is necessary.

The adjusting mechanism constituting the subject matter of this invention is an improvement over that disclosed in my copending application referred to and it is one object of the invention to provide slack eliminating mechanism which is operatively associated with mechanism enclosed in a casing forming a portion of a brake applying lever and mounted about a cam-carrying shaft, the automatically operated means being so constructed and so connected with a lever-operating rod that adjustment will be effected in response to excessive movement of the rod and so located that portions of the automatic adjusting mechanism disposed externally of the casing will be out of the way and not liable to be broken by stones thrown upwardly from a road over which the vehicle is traveling.

Another object of the invention is to provide automatic slack adjusting mechanism wherein a link connecting the lever-operating rod with a worm carrying spindle may be adjusted relative to the rod and thus the extent to which a ratchet carried by the spindle is moved relative to a companion ratchet controlled.

Another object of the invention is to so form an end portion of the spindle to which the link is connected that when the link is shifted longitudinally an off-center connection which it has with the spindle will cause the spindle to be more readily turned and thus allow the shaft to be easily adjusted.

Another object of the invention is to so arrange the manually operated adjusting means that it may be actuated externally of the casing in which the shaft is mounted and thus make it possible to manually adjust the mechanism within the casing.

Another object of the invention is to provide slack adjusting mechanism which is compact and of such construction that a worm carried by a spindle or shaft within the casing may be readily mounted thereon and moved with the shaft along a stem which passes through the worm and carries a ratchet with which a ratchet carried by the shaft cooperates.

Another object of the invention is to allow the shaft or spindle to be easily mounted through a worm which turns with it and also allow turning of one ratchet relative to another when adjustments are made automatically or manually.

Another object of the invention is to so construct the improved slack adjusting mechanisms that they are very intimately associated with a worm carrying spindle of a brake applying mechanism, the manually operated slack adjusting means being at one end of the spindle and the automatically operated slack adjusting means at the other end of the spindle and operatively connected with a forked end of a rod by means of which a lever is moved to apply the brakes.

Another object of the invention is to so construct the automatic means for adjusting slack that after the brake applying mechanism has been assembled a link for effecting operation of the automatic slack adjuster may be applied and adjusted to proper length externally of the casing forming a portion of the brake operating lever and this link also conveniently adjusted for length of movement whenever found necessary without taking the casing apart.

Another object of the invention is to provide a device of this character wherein the worm and the rotatably mounted pawl are so related to each other that during automatic adjustments rotary movements may be imparted to the worm and the worm gear without likelihood of strains causing elements to be broken and the automatic mechanism rendered inoperative.

Another object of the invention is to provide slack removing mechanism which is adapted for either manual or automatic operation and may be very easily assembled or taken apart for repair or replacement of parts when necessary.

Another object of the invention is to provide a slack removing mechanism which consists of a comparatively few number of parts and is very strong.

With these and other objects in view the invention consists of special construction and arrangement of parts illustrated in the accompanying drawings wherein:

Fig. 1 is a perspective view of a brake operating mechanism with which the improved manually and automatic slack adjusting means is incorporated;

Fig. 2 is a view in elevation of the brake operating device;

Fig. 3 is a vertical sectional view taken along the line 3—3 of Fig. 2;

Fig. 4 is a transverse sectional view taken along the line 4—4 of Fig. 2;

Fig. 5 is a vertical sectional view taken along the line 5—5 of Fig. 1;

Fig. 6 is a view taken along the line 6—6 of Fig. 2 and showing portions in section and other portion in top plan;

Fig. 7 is a group view showing elements of the device in perspective, one of said elements being in longitudinal section;

Fig. 8 is a view similar to Fig. 4 showing a modified construction;

Fig. 9 is a vertical sectional view similar to Fig. 3 and showing a modified construction;

Fig. 10 is a sectional view similar to Fig. 3 taken vertically through Fig. 9 along the line 10—10; and Fig. 11 is a group view showing elements of the modified form of slack removing mechanism in perspective with portions in section.

In Fig. 1 there have been shown brake shoes 1 and 2 which are of conventional construction and are urged toward each other by a spring 3 so that the brake shoes will be normally held out of gripping engagement with a companion brake drum, not shown. Ends of the brake shoes are spaced from each other and terminate in blocks 4 engaged by arms of a cam 5 which is rigidly carried by and turns with a rocker shaft 6 about which is disposed a casing 7. This casing constitutes an operating element for the rocker shaft and is formed of strong metal. The casing is open at opposite sides and these open sides are normally closed by plates 8 and 9 which are detachably secured by screws 10 or other means and are formed with openings 11 and 12 through which portions of the rocker shaft pass. A worm gear 13 fits about the rocker shaft and is thrust into place thereon from the outer end of the shaft, the worm gear being formed with splines 14 which fit between companion splines 15 formed longitudinally of the rocker shaft on the end thereof.

After the casing with the worm gear therein has been applied to the rocker shaft a securing bolt 16 is passed through a large washer 17 and screwed into a threaded opening or socket 18 formed axially of the rocker shaft and upon referring to Fig. 5, it will be seen that the washer overlaps portions of the plate 9 about its opening 12 and prevents the casing and the worm gear from slipping off the shaft.

A worm 19 is disposed within the casing between shoulders or inwardly thickened portions 20 and 21 formed in the casing above the worm gear. This worm is disposed transversely of the worm gear and its teeth mesh with the teeth of the worm gear. Therefore, when the casing is tilted in a direction circumferentially of the rocker shaft the teeth of the worm by meshing with the teeth of the worm gear will cause the rocker shaft to be turned and the cam 5 turned with it. When the shaft and its cam are turned in one direction the arms of the cam serve to spread the brake shoes into gripping engagement with the companion brake drum to apply brakes to a vehicle and when the casing and the shaft turn in an opposite direction the spring 3 may draw the brake shoes toward each other to a position out of gripping engagement with the brake drum to release the brakes. By turning the worm, the worm gear and the rocker shaft may be turned relative to the casing and this will turn the cam relative to the ends of the brake shoes between which it fits and thus allow wear upon the brake lining to be compensated for when the brakes fail to operate properly by not having tight gripping engagement with a brake drum.

The casing is turned by means of a lever arm 22 which is integral with and extends upwardly from the casing. A series of openings 23 which are spaced from each other longitudinally of the lever arm are formed through the upper portion thereof and through a selected one of these openings is passed a screw or bolt 24 by means of which the lever is pivotally connected with arms 25 and 26 extending from the cross head 27 of a piston rod 28 projecting from a cylinder 29 forming a portion of a conventional brake-applying structure.

This brake-applying structure is operated in the usual manner by the driver of the vehicle and during application of brakes the piston rod 28 is forced out of the cylinder and acts upon the lever 22 to tilt this lever arm and the casing and the brakes will be properly applied until the brake lining becomes worn to such an extent that it cannot be moved into gripping engagement with a brake drum by movement of the piston rod outwardly a normal distance.

The worm 19 is rotatably mounted by a spindle 30 which is formed of the two sections 31 and 32. These sections 31 and 32 of the spindle have longitudinally extending teeth 33 and the spindle has a pressed fit within the bore of the worm so that by turning the spindle the worm will be turned and rotary motion thus imparted to the worm gear for turning the cam 5 and thus compensating for wear of the brake lining. The section 32 of the spindle is enlarged as shown at 34 so that it has abutting engagement with a shoulder 35 inwardly of the outer end of the bore 36 formed through the thickened portion 21 of the casing and the outer end portion of the enlarged end 34 is further enlarged to form a head 37 which is formed with flat side faces and constitutes a wrench-engaging portion adapted to be gripped by a wrench or a pair of strong pliers and thus allow the spindle to be turned and turning of the worm accomplished for manual adjustment of the cam shaft and its cam. At the other side of the casing the inwardly thickened portion 20 is formed with a pocket 38 which is appreciably larger than the pocket 34 formed in the thickened portion 21 and at its inner end is formed with an opening 39 which is of the same diameter of the bore 36 of the thickened portion 21 and rotatably receives the section 31 of the spindle. The outer end portion of the spindle section 31 is formed with a ratchet head 40 about which are formed ratchet teeth 41 and these teeth mesh with the teeth 42 of a block 43 which serves as a pawl. This pawl or block rotatably fits within the pocket 38 and has an outstanding neck 44 from which extends a shank 45 formed integral with the neck and the pawl or block.

It should be noted that the shank is not located in axial alignment or across a true diameter of the neck but is offset transversely thereof and thus disposed in angular relation to the axis of the neck, as shown clearly in Figs. 2 and 4. An opening 46 is formed through the shank and from its inner end the block or pawl is formed with a threaded opening 47 disposed axially of the pawl. This threaded socket 47 is aligned with the bore 48 of the spindle section 31 and is also aligned with a bore 49 formed through the spindle section 32. Therefore, a stem 50 may be passed through the aligned bores of the spindle sections and screwed into the threaded socket formed in the pawl. The stem 50 is of sufficient length to extend entirely through the spindle when its threaded end 51 is screwed into the socket 47, and about its outer end portion is disposed a helical spring 52 which fits through the socket 53 and is compressed and placed under desired tension when a nut 54 is screwed upon the threaded outer end portion 55 of the stem. After the nut 54 has been applied and sufficiently tightened, a cap or shield 56 is fitted into a seat 57 formed about the outer end of the socket 53. It is to be noted that there is a space S provided within the head 37 which allows for movement of the stem 50 and for proper engagement and disengagement of the ratchet teeth 41 and 42.

A felt washer 58 fits about the neck 44 together with a washer 59 formed of steel and after these washers have been applied a split retainer ring 60 which is formed of resilient metal is fitted about the neck and expands into a groove 60' formed about the wall of the pocket 38 and serves as a removable retainer for the two washers. These washers and the retainer ring serve to prevent outward movement of the pawl beyond the position shown in Fig. 4 except the outward movement necessary when the ratchets separate in indexing, but may be easily removed when cleaning or repairs are necessary. The washers also prevent entry of dirt and water and seal lubricant in the pocket. By automatically turning the pawl more than its normal extent when the casing and its lever are turned in a brake-applying direction, the teeth of the pawl will slip over the teeth of the ratchet and re-engage in a new position relative to each other, and upon return movement of the adjuster the spindle and the worm will then be turned with the pawl and turning adjustment of the rocker shaft and the cam will be effected in order to adjust the position of the cam relative to the brake shoes. Automatic adjustment will be accomplished and slack thereby removed. Ordinarily the pawl is not turned enough to separate and re-engage in a new position with the ratchet during a brake applying operation and the brakes may thus be applied without becoming too tight. This automatic adjustment is very desirable when a heavy vehicle is moving down a steep road and it is desired to apply brakes to check the speed of the vehicle and not have the brakes fail and the vehicle coast down a steep road at high speed and in a dangerous manner. When a level stretch of road is reached at the bottom of a hill the driver may stop the truck and personally inspect the brakes in order to determine whether the automatic slack-adjusting mechanism is correctly operating and, if necessary, turn the spindle by means of its head or nut 37 in order to effect manual adjustment.

As previously stated, the automatic adjustment is to take place when the piston rod is moved outwardly beyond its normal travel to rock the lever and the casing and apply the brakes. In order to do so the shank 45 is connected with the arm 26. This arm is of greater length than the arm 25 and projects beyond the outer end thereof. A slot 61 extends longitudinally of the arm 26 from the free end thereof and through this slot is passed the stem 62 of a link pin 63 about which is formed a wrench-engaging portion 64 in order that the link pin may be firmly held while a nut 65 is tightened. This link pin projects laterally from the free end portion of the arm 26 and into a coupling sleeve 66 threaded to the upper end of a rod 67 and is formed at its side with an opening 68 to receive the link pin. The link pin has a spherical head 69 which is disposed within the sleeve 66 and together with companion bearing members 70 and 71 forms a ball and socket joint which permits the link pin to have universal tilting movement relative to the sleeve during longitudinal movement of the piston rod and its forks. A second bearing sleeve 72 is threaded to the lower end of the rod 67 which corresponds in construction to the bearing sleeve 66 and within this bearing sleeve is disposed the spherical head 73 of another link pin 74 which passes through the opening 46 formed in the shank 45 and is secured when its nut 75 is tightened. The two sleeves and the rod form the link by means of which the shank is connected with the fork 26 and since the effective length of the rod may be adjusted by turning the rod and screwing it into or out of the sleeves 66 and 72, the length of the link may be controlled. After proper adjustment has been made, lock nuts 67' are tightened.

It should also be noted that by moving the link pin 63 longitudinally of the slot 61, the extent of pull and leverage exerted upon the link and the shank 45 during movement of the piston rod may be controlled. The extent to which rotary movement is imparted to the pawl during application of brakes is thereby controlled, thus changing the length of the stroke of the adjuster to suit the installation at hand. I have, therefore, provided very good means for obtaining an automatic adjustment of slack in the brakes and also means for effecting manual adjustment.

In Fig. 8 there has been shown a modified construction in which the spindle 77 is formed as a unit instead of as companion sections which are forced into the worm through opposite ends and disposed close to each other midway the length of the worm. Most of the remaining elements are the same as those shown in Fig. 4 and are indicated by the same reference numerals, but it should be noted that the head 78 which corresponds to the ratchet 40 is formed separate from the spindle and is fitted upon a squared end 79 of the spindle after the spindle has been passed through the worm. This head or ratchet will, therefore, turn with the spindle in the same manner that the ratchet 40 turns with the spindle section 31 and since the stem is passed longitudinally through the axial bore of the spindle and screwed into the threaded socket of the head or pawl 43, the spindle and the head or ratchet 78 will be prevented from moving out of their engagement with each other. The operation in this specific embodiment is the same as that of Fig. 4 and, therefore, need not be repeated.

In Figs. 9, 10 and 11 there has been shown a slack adjusting mechanism which is of somewhat different construction but operates substantially the same as the slack adjuster previously described. Many of the elements are of the same formation as corresponding elements in the construction shown in Figs. 1 through 8 and are designated by the same reference numbers.

The casing 7 fits about the cam-carrying rocker shaft 6 and encloses the worm gear 14 which is keyed to this shaft so that the shaft and the worm gear turn together when the lever arm 22 is swung back and forth during application of brakes, the worm gear and the casing being held upon the shaft by the screw 16 and the washer 17. The worm gear meshes with a worm in the upper portion of the casing and when the worm is turned the worm gear and the shaft are turned.

This worm 79, which takes the place of worm 19, is of a somewhat different formation and has it rear end portion reduced in diameter to provide a neck or hub 80 which is rotatably mounted in an opening 81 formed through the rear portion of the upper end of the casing. A bore 82 which is of small diameter is formed through the worm axially thereof and for a portion of its length is enlarged to form a socket 83 which extends through the neck or hub to the outer end thereof and is threaded for a portion of its length, as shown at 84, so that a screw or plug 85 may be screwed into the socket with portions of its head 85' abutting the casing about the outer end of the socket. The plug not only closes the outer end of the socket but also constitutes an element to which a wrench or strong pliers may be applied and the worm turned for imparting turning movement to the worm gear and manually adjusting the rocker shaft in order to compensate for wear upon brake linings and thus remove slack. A threaded stem or pin 86 is slidably and rotatably mounted through the bore 82 and at its rear end is formed with a head 86' housed in the socket 83 together with a helical spring 87 which is confined between the head and a shoulder 88 about the junction of bore 82 with the inner end of the socket. A wrench-receiving socket 89, which is open at its outer end, is formed in the head 86' so that when the plug or screw 85 is removed the stem may be turned and the threaded end 90 of the stem screwed into the threaded socket 47 formed in the block or pawl 43. This block or pawl rotatably fits into the forward portion of the upper end of the casing and expansion of the spring 87 serves to yieldably hold the teeth 42 of the pawl in engagement with ratchet teeth 91 formed about the front end of the worm. It will thus be seen that the pawl engages with a ratchet 92 forming an integral part of the worm and that when the pawl is oscillated beyond a normal extent by action of the link 67 conected with the offset shank 45 of the pawl, the worm 79 will be turned in step by step movements and the rocker shaft 6 turned and wear upon brake linings automatically compensated for in the same manner slack is automatically removed with the mechanism shown in Figs. 1 through 8.

Attention is called to the fact that since the pawl 43 engages a ratchet forming an integral part of the worm 79, strain is applied directly to the worm when the pawl is turned in a direction to rotate the worm instead of the strain being applied to the stem which is rotatable in the bore 82 and serves as a spindle for the worm. Therefore, there is no danger of the stem or spindle 86 being broken by strain exerted when removing slack and failure of the automatic slack adjusting means cannot occur.

When repairs or replacement sof parts must be performed, it is merely necessary to remove the split retainer 60 and the metal ring 59 and the felt packing ring 58 and then remove the screw 85 and insert a wrench into socket 89 to unscrew the stem or pin 86 from the socket 47 and the pawl 43 and the worm 79 may be withdrawn from the casing.

I claim:

1. In a slack adjusting mechanism for mounting on a cam shaft, a casing, a worm gear within said casing, a worm gear within said casing and adapted to turn the cam shaft when mounted thereon, a spindle rotatably mounted in said casing transversely of said warm gear, a worm carried by said spindle and meshing with the worm gear, a ratchet at one end of said spindle, a second ratchet rotatable relative to the first ratchet and having teeth meshing with teeth of the first ratchet, a shank projecting from the second ratchet and out of said casing, a lever connected with and extending from said casing, a longitudinally shiftable operating rod having spaced arms at one end, one of said arms being pivoted to said lever and tilting the lever and said casing and for rocking said worm gear when the rod is shifted longitudinally, and a link connecting the other arm with said shank and disposed in spaced relation to said lever and serving to rotate the second ratchet and thereby impart turning movement to the spindle and for turning the worm gear to an adjusted position when the operating rod is moved longitudinally beyond a normal distance.

2. In a slack adjusting mechanism for mounting on a cam shaft, a casing, a worm gear within said casing and adapted to turn the shaft when mounted thereon, a spindle rotatably mounted in said casing transversely of said worm gear, a worm carried by said spindle and meshing with the worm gear, a ratchet at one end of said spindle, a second ratchet rotatable relative to the first ratchet and having teeth meshing with teeth of the first ratchet, a shank projecing from the second ratchet and out of said casing, a lever arm extending from said casing, a longitudinally shiftable operating rod pivoted to said lever arm for tilting the lever arm and thereby turning the casing and the worm gear a normal extent when the rod is shifted longitudinally a normal distance, and a link connecting said rod with the shank of the second ratchet in eccentric relation to the second ratchet and serving to rock the same and for turning the worm gear a sufficient distance to eliminate slack when the operating rod is shifted longitudinally a greater distance than its normal movement.

3. In a slack adjusting mechanism for mounting on a cam shaft, a casing, a gear in said casing and adapted to turn said shaft when mounted thereon, a spindle rotatably mounted through said casing, a worm mounted about and turning with said spindle and meshing with said gear, a lever arm connected with and extending from said casing, an actuating member mounted for reciprocating movement and connected with said lever for rocking the casing and for turning said gear, automatically operated means for turning said spindle and thereby effecting slack-eliminating rotary adjustment of said gear including a member having a pawl and ratchet connection with said spindle, and a member connecting the pawl with said actuating member and serving to rock the pawl an extent adapting it to impart turning adjustment to the spindle and effect slack removing turning adjustment to the gear when the actuating member is moved beyond its normal extent.

4. In a slack adjusting mechanism for mounting on a cam shaft, a casing, a gear in said casing adapted to turn said shaft when mounted thereon, a spindle rotatably mounted through said casing, a worm mounted about and turning with said spindle and meshing with said gear, a lever arm connected with and extending from said casing, an actuating member mounted for reciprocating movement and connected with said lever for rocking the casing and for turning said gear, and automatically operated means for turning said spindle and for effecting slack-eliminating rotary adjustment of said gear including a stem extending longitudinally through said spindle and rotatable therein, a ratchet at one end of said spindle, a pawl at an end of said stem rotatable therewith and yieldably held in engagement with said ratchet, and a link connecting said actuating member with said pawl and moving the pawl back and forth relative to the ratchet during movement of the lever arm, the pawl when moved beyond a normal extent acting upon said ratchet to impart rotation to said spindle and thereby causing turning of the worm and for effecting rotary adjustment of the gear.

5. In a slack adjusting mechanism for mounting on a cam shaft, a worm gear adapted to turn said cam shaft when mounted thereon, a lever including a casing adaptable for fitting about and enclosing said worm gear, a spindle rotatably mounted through said casing and to extend across the rotary axis of the worm gear, a worm carried by said spindle and meshing with the worm gear, a stem passing through said spindle axially thereof, a ratchet at one end of said spindle, a head carried by said stem and constituting a pawl, a spring urging said stem longitudinally and yieldably holding the pawl in engagement with the ratchet to cause rotation of the worm and the worm gear for effecting rotary adjustment of the worm gear when the head is turned beyond a normal extent, a longitudinally reciprocatable actuating rod connected with said lever, and a member connecting said rod with said head and rotating the head to effect turning of the spindle and rotation of the worm gear when the lever is moved by reciprocation of the rod.

6. In a slack adjusting mechanism for mounting on a cam shaft, a worm gear adapted to turn said cam shaft when mounted thereon, a lever including a casing adaptable for fitting about and enclosing said worm gear, a spindle rotatably mounted through said casing and to extend across the rotary axis of the worm gear, a worm carried by said spindle and meshing with the worm gear, a stem passing through said spindle axially thereof, a ratchet at one end of said spindle, a head carried by said stem and constituting a pawl, a spring urging said stem longitudinally and yieldably holding the pawl in engagement with the ratchet to cause rotation of the worm and the worm gear and for effecting rotary adjustment of the worm gear when the head is turned beyond a normal extent, a shank projecting from said head outwardly of said casing, a longitudinally reciprocatable actuating rod having laterally spaced arms at one end, one of said arms being pivoted to said lever and rocking the lever for effecting rotation of tthe worm gear when the rod is moved longitudinally a normal distance, and a link connecting the second said arm with said shank and serving to rock the head and the stem a sufficient distance for effecting rotary adjustment of the worm gear to eliminate slack when the rod is moved a greater distance than its normal extent of movement.

7. The structure of claim 6 wherein the shank is disposed in diametrically off-center relation to both the head and the stem and is formed with a transverse opening, the second arm being formed with a longitudinally extending slot, and the link being longitudinally adjustable and at upper and lower ends carrying pins extending transversely of the link from a side thereof and pivotally connected with the link, the lower link-pin being secured through the opening in the shank and the upper link-pin passing through the slot in the second arm and shiftable longitudinally of the slot to adjusted positions.

8. The structure of claim 6 wherein the shank is disposed in diametrically off-center relation to both the head and the stem and is formed with a transverse opening, the second arm being formed with a longitudinally extending slot, and the link connecting the second arm with the shank and being disposed vertically and at upper and lower ends carrying laterally extending pins, the lower link-pin being secured through the opening in the shank and the upper link-pin being secured through the slot in the second arm and shiftable longitudinally of the slot to adjusted positions.

9. The structure of claim 6 wherein the shank is disposed in diametrically offset relation to the head, a link extending vertically between the shank and the second arm, and pins extending laterally from upper and lower ends of said link and mounted for universal tilting movement, the lower pin being secured to said shank and the upper pin being secured to the second arm.

10. In a slack adjusting mechanism for mounting on a cam shaft, a casing, a worm gear in said casing adapted to turn said shaft when mounted thereon, a spindle rotatably mounted through said casing and extending across the worm gear, a worm mounted about and turning with said spindle and meshing with the worm gear, a lever arm connected with and extending from said casing, an actuating member mounted for reciprocating movement and connected with said lever adapted for rocking the casing and turning the worm gear, said spindle having an outer end protruding from the casing and adapted for manual turning thereof to turn the worm and for effecting rotation of the worm gear to an adjusted slack-removing position, a stem rotatably mounted through said spindle axially thereof and having one end projecting from the inner end of the spindle, a ratchet at the inner end of said spindle, a pawl carried by and turning with said stem and yieldably held in operative engagement with the ratchet, and a link connecting said pawl with said actuating member and imparting movement to the pawl relative to the ratchet an extent adapting it for turning the worm gear to an adjusted position when the actuating member is moved beyond its normal extent.

11. In a slack adjusting mechanism for mounting on a cam shaft, a casing, a worm gear in said casing adapted for turning with said cam shaft, a spindle rotatably mounted in said casing, a worm carried by said spindle and meshing with the worm gear for turning said gear when the casing is turned, an operating lever connected to the casing for turning said casing, a reciprocating operating member connected to said lever, said spindle having one end accessible exteriorly of the casing for manual turning of the spindle whereby the worm gear is turned to a slack removing position, and automatically operated adjusting mechanism for said spindle comprising a stem rotatably mounted axially of the spindle, a ratchet at the inner end of said spindle, a pawl carried by the inner end of the stem and yieldably held in operative engagement with the ratchet, and a link member connecting said pawl with the operating member for said lever whereby the pawl imparts a turning adjustment to the worm gear when the operating member is moved beyond its normal extent.

12. In a slack adjusting mechanism for mounting on a cam shaft, a casing, a worm gear within said casing adapted for turning with said cam shaft, a worm in said casing meshing with said worm gear, means for oscillating said casing and for rocking said worm gear, a ratchet rigid with one end of said worm, a pawl rotatably mounted in said casing in confronting relation to the said end of said worm and having teeth companion to teeth of the ratchet, a stem extending axially of the worm and attached to said pawl, a spring urging said stem longitudinally and yieldably holding the pawl in engagement with the ratchet, and means for rocking said pawl when the casing is moved serving to move the pawl to an adjusted position for gripping engagement with the ratchet when the pawl is moved in one direction beyond a normal extent.

13. The structure of claim 12 wherein the worm is formed with an axially extending bore in which the stem is slidably and rotatably mounted, the bore having one end portion enlarged and forming a socket having an inner end forming a shoulder about the bore, said stem having an outer end provided with a head rotatably and slidably housed in the socket, a spring in said socket disposed about the stem and abutting the shoulder and the head, and a plug mounted in the outer end of said socket.

14. The structure of claim 12 wherein the worm is formed with an axially extending bore in which the stem is slidably and rotatably mounted, the bore being enlarged for a portion of its length and forming a socket, said stem having a head housed in the socket and rotatable and slidable longitudinally therein, the inner end of the stem being threaded and screwed into a threaded socket formed in the pawl and the head of the rod being formed with a tool engaging portion, a spring about said stem engaging the head thereof and yieldably holding the pawl in clutching engagement with the ratchet, and a closure in the outer end of the socket portion of the bore.

15. In a slack adjusting mechanism for mounting on a cam shaft, a casing adapted to receive and be supported by said shaft, means for imparting normal rocking movement to said casing, mechanism within the casing having incorporated therein intermeshing gear members and a multi-part spindle structure ncluding two aligned sections on which one of said gear members is mounted to rotate therewith, a second one of said gear members being adapted to be mounted on and turn with the shaft, said spindle having a section provided with a tool-engaging portion at one end accessible from a position externally of the casing and adapting the spindle to be manually turned and thereby effect turning of the intermeshing gear members, and means operatively associated with another section of said spindle disposed within said casing and adapted to be automatically operated and thereby turn the spindle and for effecting adjusting of the said second gear during abnormal rocking movement of the casing.

16. The slack adjusting mechanism as defined in and by claim 15, wherein the automatically operated means includes a pawl and companion ratchet carried by the spindle, and a lever carried by the casing and acting upon the pawl to turn the ratchet and the spindle and for turning the intermeshing gear members during abnormal rocking of the casing and for effecting adjusting of said second one of the gear members.

References Cited in the file of this patent

FOREIGN PATENTS 276,616    Great Britain _____ Dec. 1, 1927